United States Patent
Flogaus et al.

[11] 3,846,007
[45] Nov. 5, 1974

[54] METHOD AND APPARATUS FOR DEFOCUS COMPENSATION OF A CONVERGENT BEAM SCANNER

[75] Inventors: William S. Flogaus, Alexandria; Mitsumasa Masutani, Ft. Belvoir, both of Va.

[73] Assignee: The United States of America as represented by the Secretary of the Army, Washington, D.C.

[22] Filed: Oct. 23, 1973

[21] Appl. No.: 408,904

[52] U.S. Cl.............. 350/6, 350/285, 350/26, 178/7.6
[51] Int. Cl................................ G02b 17/00
[58] Field of Search............ 178/7.6; 350/6, 7, 285, 350/288, 299, 304, 309, 287, 25, 26

[56] References Cited
UNITED STATES PATENTS
| 1,136,761 | 4/1915 | Becker | 350/6 |
|---|---|---|---|
| 1,438,974 | 12/1922 | Wente | 350/285 |

*Primary Examiner*—Ronald L. Wibert
*Assistant Examiner*—Michael J. Tokar
*Attorney, Agent, or Firm*—Edward J. Kelly; Herbert Berl; John E. Holford

[57] ABSTRACT

The inherent defocusing caused by deflecting a convergent light beamed image at the surface of a rotating mirror is minimized by shifting the axis of rotation as the mirror is rotated. The required motion is provided by essentially rolling the mirror over a cylindrical surface.

4 Claims, 5 Drawing Figures

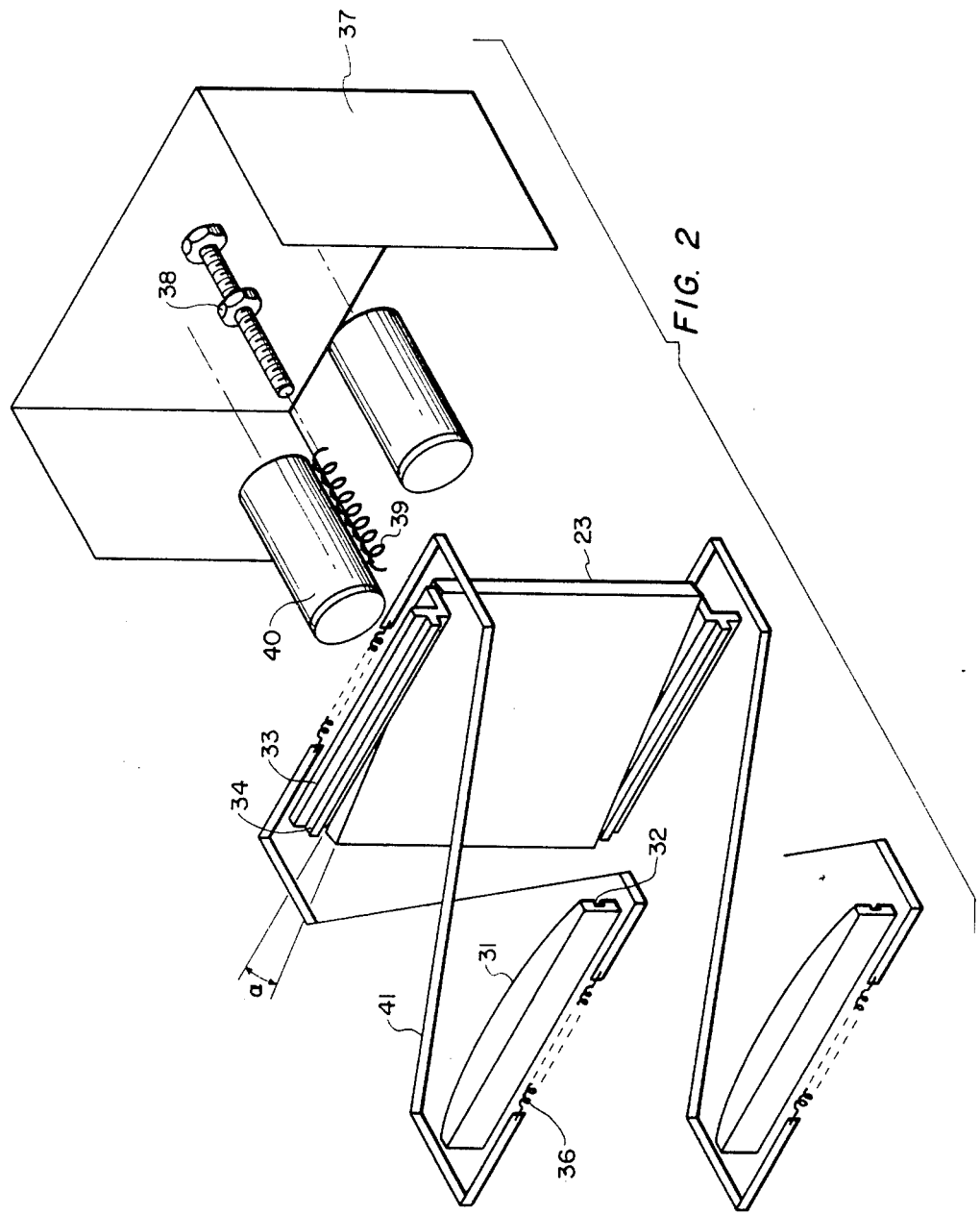

METHOD AND APPARATUS FOR DEFOCUS COMPENSATION OF A CONVERGENT BEAM SCANNER

The invention described herein may be manufactured, used, and licensed by or for the Government for governmental purposes without the payment to us of any royalty thereon.

BACKGROUND OF INVENTION

The use of rotating (or vibrating) mirrors in optical detection systems is well known. By using two such mirrors to provide horizontal and vertical scans, for example, the detection system needs only one active element. The resolution of the system is determined by the scan rate and is in turn limited by the response rate of the active element. The resolution can be increased by using additional active elements, the resultant resolution being directly proportional to the total number used. In devices employing visible light the development of integrated circuit detectors based on silicon substrates is making possible two dimensional arrays that require no mechanical scanning.

Far-infrared detectors, however, require substrate materials with smaller band gaps than silicon. Development of such circuits has lagged the silicon work in both cost reduction and complexity. The current approach in this field is to use a linear array of detectors which are scanned only in one direction. The most satisfactory scanner has been a vibrating plane mirror. The simplest arrangement would be to place the mirror between a converging lens and its image plane, the linear array being in the image plane. The deflection angle introduced by the mirror, however, causes an assymmetry in the ray pattern that results in a rather severe defocussing problem. To overcome this lenses are placed on both sides of the scanning mirror to produce a parallel ray pattern at the mirror face.

The above system has several disadvantages. Without unduly complicating the optic system, this arrangement requires that the mirror be larger than the aperture of the objective lens. In the convergent beam system the mirror size can be reduced by an order of magnitude or more. The former system also requires a split lens arrangement which entails alignment problems, greater cost and a reduction in design flexibility.

The present invention provides a method and apparatus for deflecting a scanning mirror that practically eliminates the defocussing problem when a convergent ray system is used. The mirror is constrained to move so that it remains tangent to a cylindrical surface. This very nearly approaches the ideal defocussing compensation while permitting a practical mechanical drive system to be employed.

BRIEF DESCRIPTION OF DRAWINGS

The invention is best understood with reference to the accompanying drawings wherein:

FIG. 2 shows the structure of a defocus compensated scanner according to the present invention.

DESCRIPTION OF INVENTION

Figure 1A:
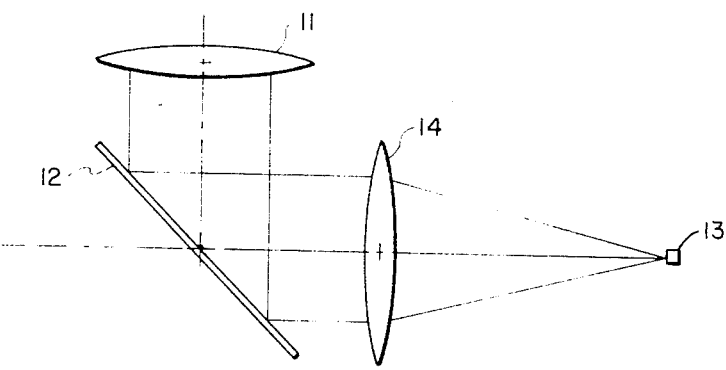
FIG. 1a shows a ray diagram of prior art parallel beam scanning system.

A parallel ray scanning system is shown in FIG. 1a. The light from a scene or a linear array of LEDs is gathered by a fixed lens 11 and converted to a parallel light beam. The beam remains parallel after reflection by a vibrating mirror 12 and, therefore, can always be refocussed on a fixed image plane by the fixed lens 14. A linear array 13 of electro-optical elements, i.e. light detectors, or an observers eye is located in the image plane to integrate the image in line segments as a function of scan time.

Figure 1B:
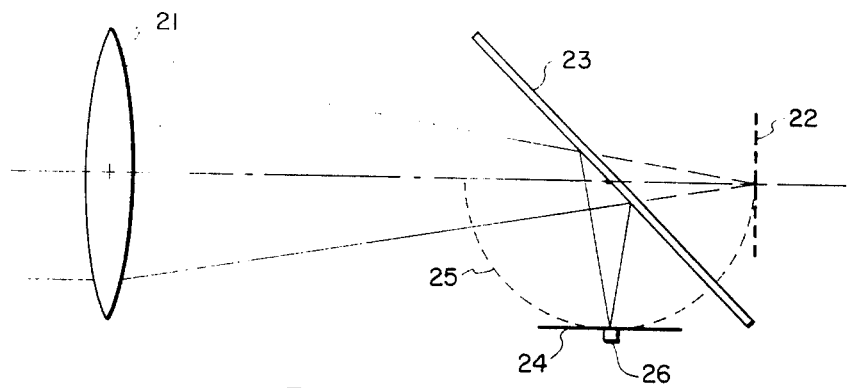
FIG. 1b shows a ray diagram of simple prior art convergent beam scanner without defocus compensation and positioned at the center of a scan.

FIG. 1b shows the same scanning method applied to a convergent beam system. The lens 21 focusses a distant scene in an image plane which normally would be the plane 22 behind the mirror 23. The presence of the mirror displaces the center of the image 24 to a point on the circle 25 the latter being centered on the pivot point of the mirror and passing through the focal point of lens 21. The plane image remains tangent to circle 25 at all deflection angles. At some convenient deflection angle (usually 90°) the linear array 26 is mounted on the circle 25 parallel to the axis of the mirror.

Figure 1C:
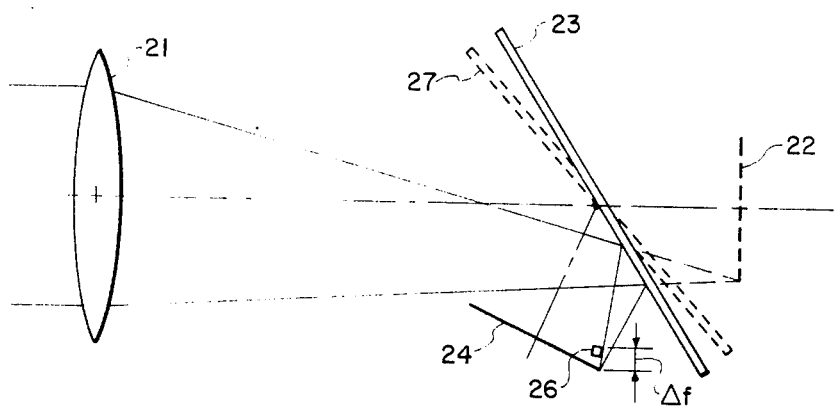
FIG. 1c shows the system of FIG. 2 positioned near one end of a scan.

FIG. 1c shows the appropriate ray diagram when the mirror is fully deflected clockwise from its initial position 27. The image 24 is displaced so that one edge is directed on detector 26. However, it is easily noted by simple geometry that the electro-optical element, which does not move, is in front of the edge of the focal plane a short distance ($f$). It is also obvious that a full deflector counterclockwise will produce the same result. The maximum degree of defocussing can be decreased by permitting an equal and opposite degree of defocussing at the center as compared to the edges. However, the most important data is usually near the center and in any event the image formed is far from satisfactory.

FIG. 2 shows a mechanism according to the present invention for reducing the defocussing of the device in FIGS. 1b and 1c, while retaining its advantages of small size and weight. The mirror 23, which is preferably rectangular, instead of being pivoted about a fixed axis is rolled over a pair of identically curved edge supports 31. The rolling surfaces for the mirror are provided by two straight rail members 33. The plane rolling surfaces of the rails are inclined at an angle with the reflecting surface, for reasons which will be explained in connection with FIG. 3. The rail members have raised portions 34 that mate with grooves 32 in the end support members to prevent any axial displacement of the mirror as it rotates. Slippage between member 32 and 33 may be prevented by tension bands 41 which loop around the two members in a figure 8 formation and are elastic or contain a tension element such as spring 36. The same two members, can alternatively be fitted with teeth like gear teeth to insure smooth rolling without slippage.

The edge supports are attached to a housing member 37 which partially surrounds the mirror with an open portion to pass the required light rays. An adjustable spring support 38 is also attached to the housing behind the center of mirror and a compressed spring 39 mounted between the support and mirror center urges the mirror to remain in constant contact curved edge support. Two solenoids 40 attached to the housing on opposite sides of the spring support so that their pole pieces are near the back of the mirror on opposite sides of its central axis of rotation to provide magnetic drive power. The mirror itself can be made from lightweight material and magnetic elements can be attached thereto to cooperate with the solenoids forming a typical magnetic drive system. The solenoids are electrically connected to amplifiers and the like (not shown) to form a triangular wave generator which drives the mirror at substantially constant angular velocity during each scan.

It has been determined that for simplicity the curve on which the mirror rolls can be circular and still provide nearly ideal defocus compensation. The system design parameters will determine the width of the mirror and the scan angle needed for the required field of view (FOV). These parameters in turn determine the radius (R) of the mirror edge support members. A typical system may have the following parameters.

| | |
|---|---|
| f – (focal length of lens system) | 6 inches |
| F – (f/diameter of lens opening) | 2 inches |
| R – (spacing of scanning mirror from axis) | 3.5 inches |
| r – (spacing of detector from scanning mirror) | 1.5 inches |
| FOV – (Field of View) | 5° × 10° |
| θ – (Half angle of scan) | 20° |
| η – (angle of incidence with scan mirror centered) | 60° |
| α – (See FIG. 2) | 0.5° |
| Scan Rate (20 frames/sec) | 10 cps |

Figure 3:
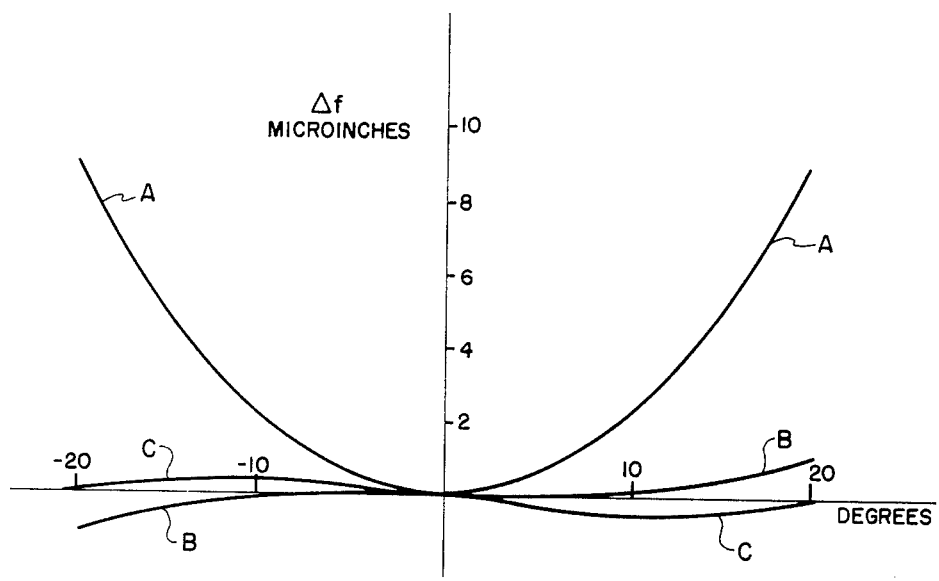
FIG. 3 shows a graph of defocussing vs scan angle for the convergent scanner of FIG. 1.

FIG. 3 shows a graph of the defocussing distance $f$ as a function scan angle. Curve A shows the curve for a system equivent to that specified above, but using a pivoted mirror without defocus compensation. Curve B is the same system but with $\alpha=0$; and curve C is again the same system but with $\alpha$ equal to 0.5°. Changing $\alpha$ can considerably reduce the maximum defocussing within the scan range as evidenced by comparison of curves B and C. The radical improvement of the present system over the prior art is readily discerned by comparing curve A with either curve B or curve C.

Present systems sometimes use both sides of the mirror, which is not optically possible in the present system. However, since the axial dimension of the mirror can be extended without affecting other system parameters (except possibly drive power), separate far-infrared and visible scanning systems can operate on different axially separated areas of the mirror face. These areas can be coated to maximize reflections of the wavelengths associated with the infrared detectors and light emitting diodes (LEDs) used in such systems.

Also, it is possible to use the same portions of the mirror for both systems. The detector and LED arrays being small can be placed close together so that the angular difference in their scans is smaller than $\alpha$. The LEDs are unaffected by the IR radiation and detectors would not see the radiation from the LEDs. The observers eye would receive, but would not respond to the IR image. The latter could be filtered out. The chief difficulty would be separating the axes of the two lens systems to make room for the lens elements.

Obviously many variations of the above structures will occur to those skilled in art, but the present invention is limited only by the claims which follow.

We claim:

1. In an optical scanning system, wherein a linear array of electro-optical elements is optically coupled to a lens system by a variable reflector having at least one planar scanning mirror, the improvement which comprises:

a drive means interconnecting said array and said mirror to provide relative rotation therebetween only about an axis in the plane of the reflecting surface on said mirror parallel to said linear array and to provide relative translation therebetween only normal to said linear array the rotation and translation being interrelated such that said reflecting surface maintains a tangential relationship with a right circularly cylindrical reference surface having an axis in fixed parallel relationship to said linear array.

2. An optical scanning system according to claim 1 wherein said drive means comprises:

at least one edge support member having an outer surface coincident with said reference surface;

a housing member attached to edge support member and extending behind said mirror;

a spring support member attached to said housing member behind said mirror;

a compression spring member mounted on said spring support member and pressing on the back of said mirror near the center thereof; and first and second solenoids mounted on said housing member each magnetically coupled to an opposite end of said mirror, whereby push-pull excitation of said solenoids produces a smooth rocking action of said mirror.

3. An optical scanning system according to claim 2 wherein:

said edge support member includes circumferential contours on its outer surface;

said scanning mirror includes a straight edge rail with mating contours to engage said circumferential contours; and non-slip means are connected between said edge rail and said support member to prevent relative movement between contacting portions thereof in a circumferential direction.

4. An optical scanning system according to claim 3 wherein:

said edge rail is mounted at a small angle with said reflecting surface.

* * * * *